April 14, 1970  L. W. HAYES ET AL  3,506,543
URINE RECOVERY PROCESS BY THERMO-ELECTRIC
DISTILLATION AND FILTRATION
Filed July 13, 1964

Inventors:-
Lawrence W. Hayes,
John T. Cross,
BY
Hofgren, Wegner, Allen,
Stellman & McCord Attys.

United States Patent Office 3,506,543
Patented Apr. 14, 1970

3,506,543
URINE RECOVERY PROCESS BY THERMOELECTRIC DISTILLATION AND FILTRATION
Lawrence W. Hayes and John T. Cross, St. Joseph, Mich., assignors to Whirlpool Corporation, a corporation of Delaware
Filed July 13, 1964, Ser. No. 382,150
Int. Cl. B01d 3/00
U.S. Cl. 203—10       1 Claim

ABSTRACT OF THE DISCLOSURE

A method of providing potable water from human urine under the conditions found in space travel. A thermoelectric means is provided for heating and cooling the different fluids in the system. The urine is heated in a boiler to form steam, which steam is then cooled to form a condensate and noncondensed gases which are subsequently separated from the condensate. The condensate is further flowed through a charcoal filter and an ion exchange filter. Ammonia is removed from the urine as a function of the boiling at the relatively low pressures found in space travel or alternatively by conventional ammonia removing methods.

---

Figure 1:
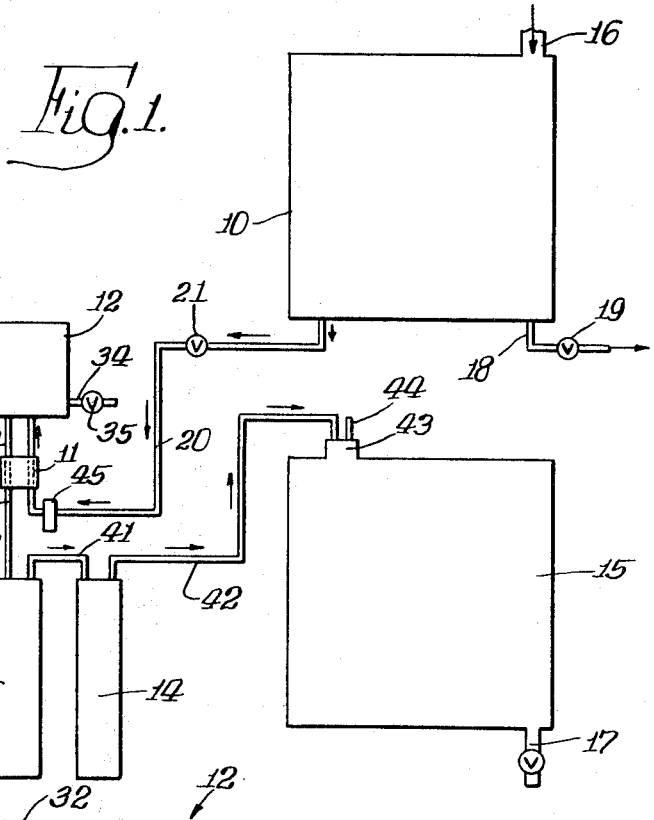

This invention relates to methods of providing potable water, and in particular to a method of recovering potable water from human urine.

In certain environments, such as found in space travel, it is desirable to provide potable water by recovering the same from human urine. Thus, for example, in a manned space craft the repetitive reuse of the available water by recovery thereof from human urine permits the use of a substantially reduced water reservoir supply, thereby substantially increasing the efficiency of weight utilization in the vehicle. Heretofore, no completely satisfactory method of recovering potable water from human urine has been available, and, thus, there has been a serious limitation on the weight load efficiency in this respect.

The present invention comprehends an improved method of recovering potable water from human urine providing a novel solution to this vexatious problem.

Thus, a principal feature of the present invention is the provision of a new and improved method of recovering potable water from human urine.

Another feature of the invention is the provision of such a method including the steps of treating the urine to separate ammonia therefrom, heating the treated urine to a preselected temperature below the boiling temperature, transferring the heated, treated urine to a boiler and evaporating it therein to form steam, cooling the steam to form condensate and noncondensed gases, separating the gases and condensate, flowing the condensate through a charcoal filter, and flowing the condensate through an ion exchange filter to form the condensate into potable water.

Another feature of the invention is the provision of such a method wherein the preselected temperature is less than approximately 3° F. below the condensate temperature.

A further feature of the invention is the provision of such a method wherein the evaporation is carried out in a sterilizing temperature.

Still another feature of the invention is the provision of such a method wherein the condensate is flowed in heat exchange relationship with additional treated urine to heat the additional treated urine to the preselected temperature.

A yet further feature of the invention is the provision of such a method wherein the urine is originally treated to substantially prevent forming of the urine during the boiling operation.

A still further feature of the invention is the provision of such a method wherein foam and liquid are prevented from passing from the urine with the steam during the boiling operation.

Still another feature of the invention is the provision of such a method wherein thermoelectric heating means and cooling means are provided for respectively boiling the urine and cooling the resultant steam, with the cooling means being arranged to lower the temperature of the steam to a temperature above the preselected temperature to which the urine is heated before being transferred to the thermoelectric boiler.

Figure 2:
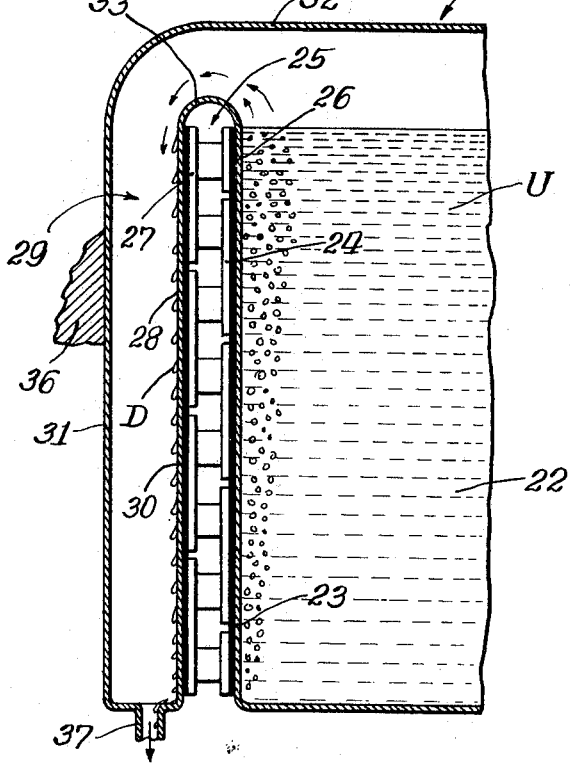

Other features and advantages of the invention will be apparent from the following description taken in connection with the accompanying drawing wherein:

FIGURE 1 is a schematic diagram illustrating a method of recovering potable water from human urine, embodying the invention; and FIGURE 2 is an enlarged fragmentary vertical section of the thermoelectric boiler illustrated in FIGURE 1.

In the illustrative embodiment of the invention, as disclosed in the drawing, means for practicing the method of the present invention are shown to comprise a pretreatment tank 10, a heat exchanger 11, a boiler, or still, 12, a charcoal filter 13, an ion exchange filter 14, and a potable water tank 15. The pretreatment tank is provided with an inlet 16 through which human urine is delivered to the tank, and the potable water tank is provided with an outlet 17 from which potable water may be drawn as desired.

In practicing the method of recovering potable water from human urine as comprehended by the invention, the urine collected in tank 10 is first treated to minimize ammonia carry-over in the resultant potable water. One method of treating the urine in tank 10 to effect the separation of ammonia therefrom is the addition of ten percent by weight of potassium persulfate to the urine. While potassium persulfate functions well in preventing substantially all ammonia carry-over and does substantially reduce scaling tendencies within the boiler 12, it does permit some foaming at the top of the boiling urine in the boiler 12. This foaming can be substantially reduced by the application of silicone material on the inner walls of the boiler at the top portion thereof, or by placing a hydrophobic filter over the boiling zone in the boiler 12 to pass the steam but repel liquid and foam back into the body of liquid being boiled.

Another method of treating the urine in the tank 10 is the addition of 3% by volume of concentrated sulfuric acid. This method appears at present to be the preferred method as it substantially eliminates foaming in the boiler. It further provides improved drainability of the resultant concentrate in the tank 10 as during periodic removal of the concentrate through a sludge outlet 18 having a suitable valve 19.

The treated urine is delivered through a suitable conduit 20 having a conventional valve 21 to the heat exchanger 11. In the heat exchanger 11, the urine is heated to a preselected temperature slightly below the temperature at which the condensed steam leaves the boiler 12. By arranging the heat exchanger 11 suitably to have an extremely low flow rate of the liquid therethrough, the urine may be brought to within 3° F. or less of the temperature of the condensate leaving the boiler 12.

In the boiler or still 12, the urine is heated to boiling temperature. In the illustrated embodiment, the heating of the urine U is effected in a central well 22 having an upright outer wall 23 which is in heat transfer relationship with the hot junctions 24 of a plurality of thermoelectric elements 25 of conventional construction. As shown in FIGURE 2, the hot junction 24 are spaced from the wall 23 by a dielectric layer 26. The thermoelectric elements further include cold junctions 27 which are in heat transfer relationship with an inner cylindrical wall 28 of a condenser 29, the cold junctions being spaced from the wall 28 by a dielectric layer 30. The outer wall 31 of the condenser 29 is spaced radially outwardly of the inner wall 28 and may comprise a depending wall portion of an outer housing 32 of the boiler 12. The walls 23 and 28 may be formed continuously as shown in FIGURE 2 with an upper weir portion 33 bridging the space therebetween and overlying the thermoelectric elements 25. The walls 23 and 28 may be formed of a suitable corrosion resistant material, such as stainless steel.

In practicing the invention, it is desirable to maintain the level of the urine U in the well 22 at a level of the upper end of the thermoelectric elements 25, so as to maximize the efficiency of the evaporation process. As indicated above, where sulfuric acid is utilized to pretreat the urine, foaming is effectively eliminated in the boiler. However, some bubbles do form, but have been found to break up rapidly, and, thus, do not present any serious liquid carry-over problem. As indicated above relative to the use of potassium persulfate as a pretreating chemical, any tendency to foam or pass liquid upwardly with the vapor may be counteracted by placing a hydrophobic filter over the urine in the well 22.

As the urine is boiled, the concentration thereof increases. When the concentration reaches approximately 85%, the concentrate is preferably withdrawn from the tank as through an outlet 34 having a suitable valve 35. In connection with this removal of the concentrate, it has been noted that the use of potassium persulfate as the pretreatment chemical tends to cause crystals to form rapidly as the concentrate is cooled, and, thus some clogging of the outlet 34 has been noted.

It is desirable that the minimum boiling temperature within the boiler 12 be at least the pasteurization temperature of 159° F. Thus, any microorganisms present in the urine will be destroyed within fifteen seconds in well 22 at 160° F.

As the steam passes into the condenser 29, it contacts the relatively cold surface defined by the wall 28 and is caused to condense thereon. The latent heat of condensation is utilized by the thermoelectric elements for further heating the urine in the well 22. It is desirable to maintain the temperature difference between the wall 28 and the wall 23 as low as possible to provide highest efficiency in the still 12. To improve the efficiency of heat transfer, it is preferable that the condensation occur on the wall 28 in the form of droplets D rather than in a film flowing down the wall. To promote such droplet formation, the wall 28 is preferably treated with silicone. To minimize heat loss through the outer wall 31, the wall may be surrounded by a suitable body of insulation 36 shown fragmentarily in FIGURE 2.

From the condenser 29, the condensate is delivered through a conduit 37 back to the hot side of the heat exchanger 11. Connected to the hot side of the heat exchanger 11 is a conduit 38 which is provided for venting air and other non-condensible gases from the condensate to prevent undesirable disturbing of the filters 13 and 14 and short circuiting of the condensate therethrough. A charcoal vent filter 39 may be provided at the distal end of the conduit 38 for passing the noncondensable gases and air into the atmosphere.

The heat exchanger 11 is preferably an externally insulated heat exchanger of conventional construction arranged to transfer the maximum heat energy from the condensate to the urine to be delivered to the still 12 for evaporation therein. As indicated briefly above, the rate of flow of the condensate through the heat exchanger 11 and the rate of flow of the urine therethrough to the still 12 are preferably relatively low so that maximum heat transfer may be effected therebetween within the heat exchanger.

The low temperature condensate from the heat exchanger through a conduit 40 to the charcoal filter 13, and thence through a conduit 41 to the ion exchange filter 14. In each of these filters, the rate of flow of the condensate is preferably very low as compared to the cross-sectional area so as to provide extremely high efficiencies therein. The charcoal filter is preferably provided with activated charcoal, and the ion exchange filter is preferably a conventional mixed bed ion exchange filter utilizing both anionic and cationic resins.

From the ion exchange filter the water is delivered through a conduit 42 to the inlet 43 of the potable water tank 15. The inlet 43 is further preferably provided with an air break 44 preventing siphoning of the tank.

Thus, in practicing the method of recovering potable water from human urine comprehended by the present invention, the user merely fills the pretreatment tank 10 with urine and adds the appropriate amount of deammoniating material, such as sulfuric acid. Sufficient urine is then delivered from the tank to the still 12 to provide a urine level therein at least at the upper level of the thermoelectric elements 25. The steam formed from the boiling urine is then condensed and passed through the heat exchanger 11 permitting new urine to be delivered from the tank 10 into the still 12 while being preheated in the heat exchanger 11. The condensate passes through the charcoal filter 13 and ion exchange filter 14 into the tank 15 for use as potable water. Obviously, suitably automatic controls may be associated with the apparatus to provide an automatic functioning as described above. Further, to permit utilization of a minimum size thermoelectric heating unit, preheater means 45 may be provided for heating the urine originally delivered into the still 12 before the boiling action is effected.

In maintaining the apparatus, periodic removal of the precipitate and sludge from the tank 10 is effected through conduit 18 and periodic draining of the boiler 12 is effected through the conduit 34.

While we have shown and described one embodiment of the invention, it is to be understood that it is capable of many modifications. Changes, therefore, in the construction and arrangement may be made without departing from the spirit and scope of the invention as defined in the appended claim.

The embodiment of the invention in which an exclusive property or privilege is claimed is defined as follows:

1. A method of recovering potable water from human urine, comprising the steps of:
    chemically treating the urine to separate ammonia therefrom and to substantially prevent foaming of the urine when boiling;
    heating the treated urine to a preselected temperature less than approximately 3° F. below the boiling temperature;
    transferring the heated, treated urine to a boiler having a thermoelectric heating means and flowing the urine in heat exchange relationship with hot junctions of the heating means to form steam at a sterilizing temperature of at least approximately 159° F.;
    flowing the steam in heat exchange relationship with cold junctions of the heating means to lower the temperature to a temperature above said preselected temperature to form condensate and non-condensed gases;
    flowing the condensate in heat exchange relationship with additional treated urine to heat said additional urine to said preselected temperature;
    separating the gases and condensate;

flowing the condensate through a charcoal filter; and flowing the condensate through an ion exchange filter to form the condensate into potable water.

References Cited

UNITED STATES PATENTS

| | | |
|---|---|---|
| 2,469,729 | 5/1949 | Hunter. |
| 3,127,243 | 3/1964 | Konikoff _____ 203—11 |
| 3,212,999 | 10/1965 | Sommers _____ 203—100 |
| 3,218,241 | 11/1965 | Checkovich _____ 203—7 |
| 3,242,058 | 3/1966 | Ganley _____ 203—10 |
| 3,261,764 | 7/1966 | Casey. |
| 3,268,441 | 8/1966 | Lindstrom _____ 210—39 |

FOREIGN PATENTS 619,421  5/1961  Canada.

WILBUR L. BASCOMB, JR., Primary Examiner

U.S. Cl. X.R.

23—162; 202—177, 187, 202, 234; 203—20, 22, 33, 35, 41, 100; 210—23, 39